United States Patent
Seo et al.

(10) Patent No.: US 12,011,141 B2
(45) Date of Patent: Jun. 18, 2024

(54) ELECTRONIC DEVICE USING HYBRID CHARGING DEVICE INCLUDING HYBRID BATTERY AND MANUFACTURING METHOD THEREOF

(71) Applicant: Jaekwang Seo, Uiwang-si (KR)

(72) Inventors: Jaekwang Seo, Uiwang-si (KR); Woo-Sik Jeong, Incheon (KR); Hyun Bong, Seoul (KR)

(73) Assignee: Jaekwang Seo, Uiwang-si (KR)

( * ) Notice: Subject to any disclaimer, the term of this patent is extended or adjusted under 35 U.S.C. 154(b) by 346 days.

(21) Appl. No.: 17/352,608

(22) Filed: Jun. 21, 2021

(65) Prior Publication Data

US 2022/0061619 A1   Mar. 3, 2022

(30) Foreign Application Priority Data

Aug. 26, 2020   (KR) .......................... 10-2020-0107991

(51) Int. Cl.
H02J 7/00        (2006.01)
A47L 9/28        (2006.01)
H02J 7/34        (2006.01)

(52) U.S. Cl.
CPC .......... *A47L 9/2878* (2013.01); *A47L 9/2873* (2013.01); *H02J 7/007182* (2020.01); *H02J 7/345* (2013.01); *H02J 2207/50* (2020.01); *H02J 2310/14* (2020.01)

(58) Field of Classification Search
None
See application file for complete search history.

(56) References Cited

U.S. PATENT DOCUMENTS

2014/0265565 A1*  9/2014  Cooley ............. H02J 7/007184
                                              320/167
2019/0254493 A1*  8/2019  Conrad ................... A47L 9/322

FOREIGN PATENT DOCUMENTS

JP   2003-190045      7/2003
KR   20-2008-0000259  3/2008
KR   10-2018-0105121  9/2018

* cited by examiner

*Primary Examiner* — Arun C Williams
(74) *Attorney, Agent, or Firm* — LEX IP MEISTER, PLLC (57) ABSTRACT

An electronic device according to an embodiment of the present invention may include: a dust suction part; a body part including a motor for generating suction force of the electronic device and a battery module operable by a power source of the motor; and an extension pipe combined between the dust suction part and the body part and providing a passage for moving foreign substances absorbed through the dust suction part to the body part, wherein the extension pipe may include a pipe-type external case, a supercapacitor module disposed in an inner space of the pipe-type external case and including a hollow space used as the passage, and a first docking connector for transmitting electrical energy of the supercapacitor module to the motor when the body part is combined to the extension pipe.

13 Claims, 9 Drawing Sheets

ELECTRONIC DEVICE USING HYBRID CHARGING DEVICE INCLUDING HYBRID BATTERY AND MANUFACTURING METHOD THEREOF

CROSS-REFERENCE TO RELATED APPLICATION

This application claims priority to and the benefit of Korean Patent Application No. 10-2020-0107991 filed in the Korean Intellectual Property Office on Aug. 26, 2020, the entire contents of which are incorporated herein by reference.

BACKGROUND

(a) Field

Embodiments relates to an electronic device using a hybrid charging device including a hybrid battery, and a manufacturing method thereof.

(b) Description of the Related Art

Recently, convenient electronic devices that have no restriction on movement and installation spaces caused by electrical lines have been paid high attention. For example, wireless cleaners are raising occupation rates in the cleaner market.

A rechargeable battery that can be repeatedly charged and discharged is installed as a power source in the wireless cleaners, and the rechargeable batteries used in wireless home appliances include a nickel-cadmium battery, a lead-acid battery, a nickel metal hydride (NiMH) battery, a lithium ion battery, and a lithium polymer battery.

The rechargeable battery has high energy density, with 500 to 1000 charging/discharging cycles, and it may be exploded by heat, so it is difficult to tolerate charging/discharging at a very high current level as a drawback. Contrary to this, a supercapacitor has a semi-permanent lifespan, and has a quick charging/discharging characteristic, so it may be used to mutually supplement the chemical rechargeable battery.

However, when the supercapacitor is applied to the wireless cleaner, a volume of the wireless cleaner increases, and as sparks are generated because of a high-capacity high-power characteristic of the supercapacitor, electronic parts in the circuit may burn out or be damaged by fire.

The above information disclosed in this Background section is only for enhancement of understanding of the background of the art, and therefore it may contain information that does not form the prior art that is already known in this country to a person of ordinary skill in the art.

SUMMARY

Embodiments are directed to an electronic device that may include: a dust suction part; a body part including a motor for generating suction force of the electronic device and a battery module operable by a power source of the motor; and an extension pipe combined between the dust suction part and the body part and providing a passage for moving foreign substances absorbed through the dust suction part to the body part. The extension pipe may include a pipe-type external case, a supercapacitor module disposed in an inner space of the pipe-type external case and including a hollow space used as the passage, and a first docking connector for transmitting electrical energy of the supercapacitor module to the motor when the body part is combined to the extension pipe.

The supercapacitor module may include a plurality of supercapacitors connected to each other in series, and the supercapacitors may respectively have a cylindrical shape in which a hollow space used as the passage is formed in a center.

The supercapacitors may respectively include a case including an inner wall in a cylindrical shape, an outer wall in a cylindrical shape spaced from the inner wall with a predetermined gap and surrounding the inner wall, and first and second plates respectively combined to respective ends of the inner wall and the outer wall and closing and sealing a space between the inner wall and the outer wall; a capacitor disposed in a space between the inner wall and the outer wall; a first electrode terminal in a protruding shape formed on the first plate; and a second electrode terminal in an indented shape formed on the second plate.

The supercapacitors may include first and second supercapacitors connected to each other in series, and the first electrode terminal of the second supercapacitor may be inserted and combined to the second electrode terminal of the first supercapacitor.

The supercapacitors may respectively further include: a third electrode terminal in an indented shape formed on the first plate and having a same polarity as the first electrode terminal; and a fourth electrode terminal in a protruding shape formed on the second plate and having a same polarity as the second electrode terminal, and the fourth electrode terminal of the first supercapacitor may be inserted and combined to the third electrode terminal of the second supercapacitor.

The electronic device may further include a packing in a ring shape disposed between the second plate of the first supercapacitor and the first plate of the second supercapacitor.

The electronic device may further include a safety cock disposed on the outer wall and discharging gas inside the case to an outside.

The body part may include: a second docking connector connected to the supercapacitor module through the first docking connector when the body part is combined to the extension pipe; a power switch disposed at at least one of wires for connecting terminals of the second docking connector and the motor and switching an electrical connection between the second docking connector and the motor; and a control module for detecting whether the extension pipe is combined to the body part, and controlling the power switch so as to form a current path between the supercapacitor module and the motor when the body part is combined to the extension pipe.

The control module may be connected to the second docking connector, and may charge the battery module with an output of the supercapacitor module when the body part is combined to the extension pipe.

The control module may detect a voltage of the supercapacitor module when the body part is combined to the extension pipe, and it may transmit an output of the battery module to the motor when a voltage of the supercapacitor module is equal to or less than a predetermined value.

The control module may transmit an output of the battery module to the motor when the combination of the body part and the extension pipe is removed.

The body part may further include a switch for selecting one of the supercapacitor module and the battery module as a power source of the motor, and the power switch may be turned on or turned off according to an operation of the switch.

When the switch is operated to select the supercapacitor module as a power source of the motor, the power switch may be turned on by the switch and an output of the supercapacitor module may be transmitted to the motor, and when a voltage of the supercapacitor module becomes equal to or less than a predetermined value or the switch is operated to select the battery module as a power source of the motor, the power switch may be maintained in a turn-off state, and an output of the battery module may be transmitted to the motor by the control module.

Embodiments are also directed to a charging device of a wireless electronic device for receiving a power voltage from a supercapacitor module, including: a high-rate discharging battery pack charged by an external power source, and supplying a current equal to or greater than a predetermined value to the supercapacitor module so as to quickly charge the supercapacitor module; and a high-rate discharge circuit for transmitting the current supplied by the high-rate discharging battery pack to the supercapacitor module.

The charging device may further include a protective circuit for stopping quick charging and providing a detour charging path for slow charging when the high-rate discharging battery pack becomes abnormal.

Embodiments are also directed to a portable quick charging and discharging device for a wireless electronic device for receiving a power voltage by a supercapacitor module, the portable quick charging and discharging device combined to the wireless electronic device and charging the supercapacitor module with a voltage supplied from an external DC voltage or transmitting a voltage of the supercapacitor module to an external load.

BRIEF DESCRIPTION OF THE DRAWINGS

Features will become apparent to those of skill in the art by describing in detail example embodiments with reference to the attached drawings in which.

DETAILED DESCRIPTION OF THE EMBODIMENTS

Hereinafter, exemplary embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from others.

Singular forms are to include plural forms unless the context clearly indicates otherwise.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically coupled" to the other element through a third element. Unless explicitly described to the contrary, the word "comprise" and variations such as "comprises" or "comprising" will be understood to imply the inclusion of stated elements but not the exclusion of any other elements.

An electronic device according to embodiments will now be described with reference to accompanying drawings. Embodiments will be described with a wireless cleaner as an example of the electronic device. An applying range of embodiments is not limited to the wireless cleaner, and it may be applied to various kinds of electronic devices including a charging device according to embodiments.

Figure 1:
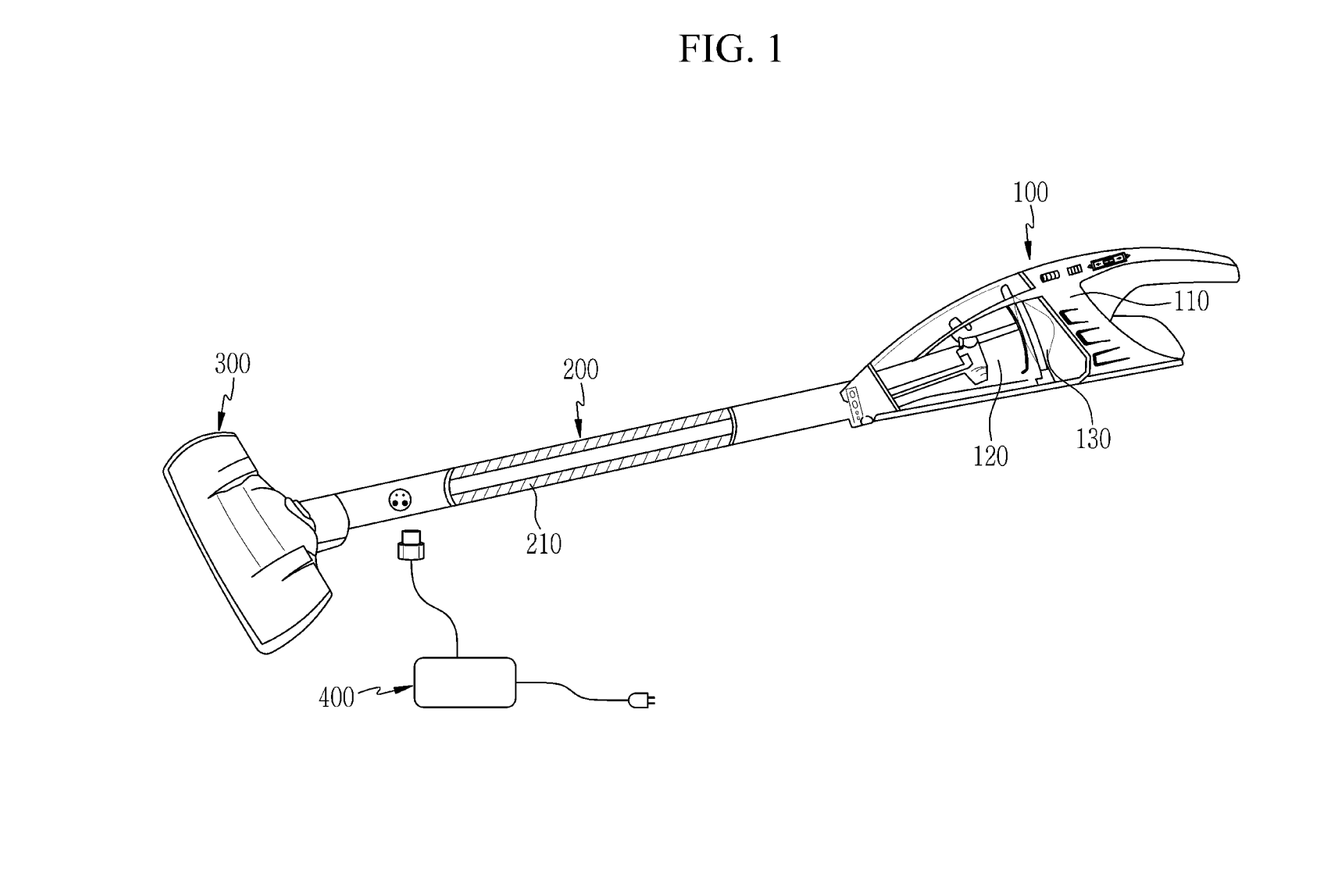
FIG. 1 shows a perspective view of a wireless cleaner according to an example embodiment.
Figure 2:
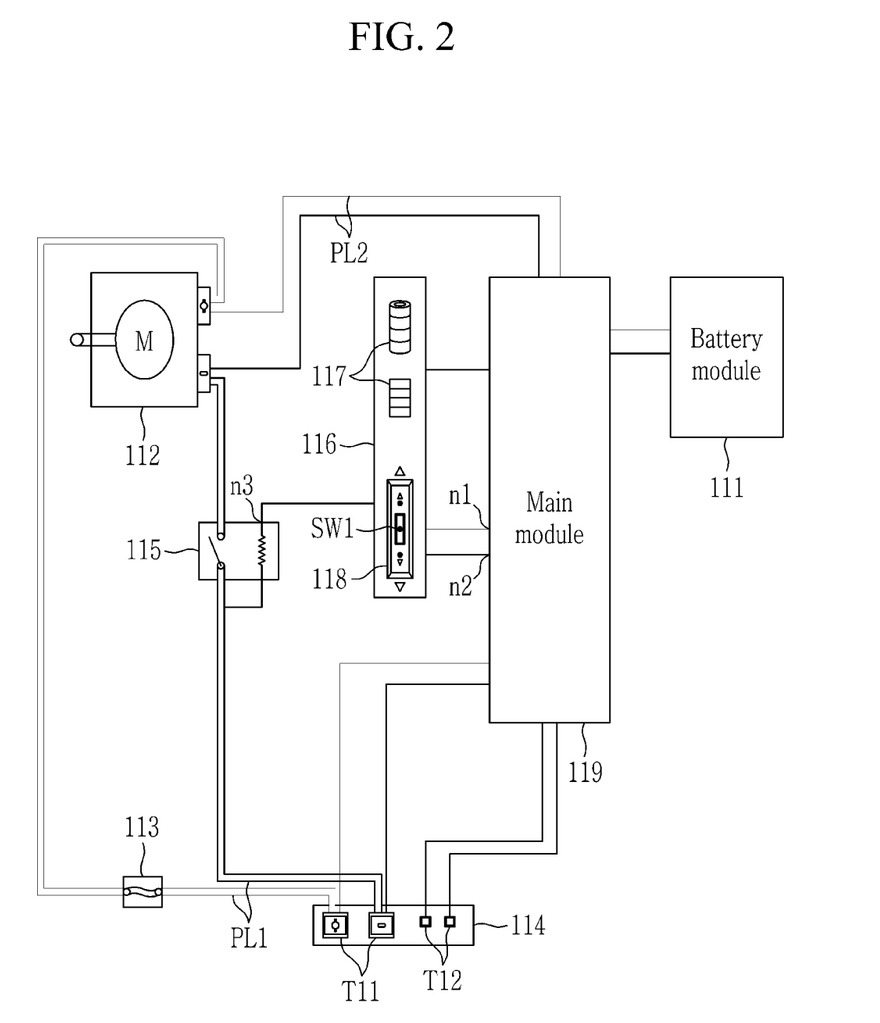
FIG. 2 shows a main driver of a wireless cleaner according to an example embodiment.
Figure 3:
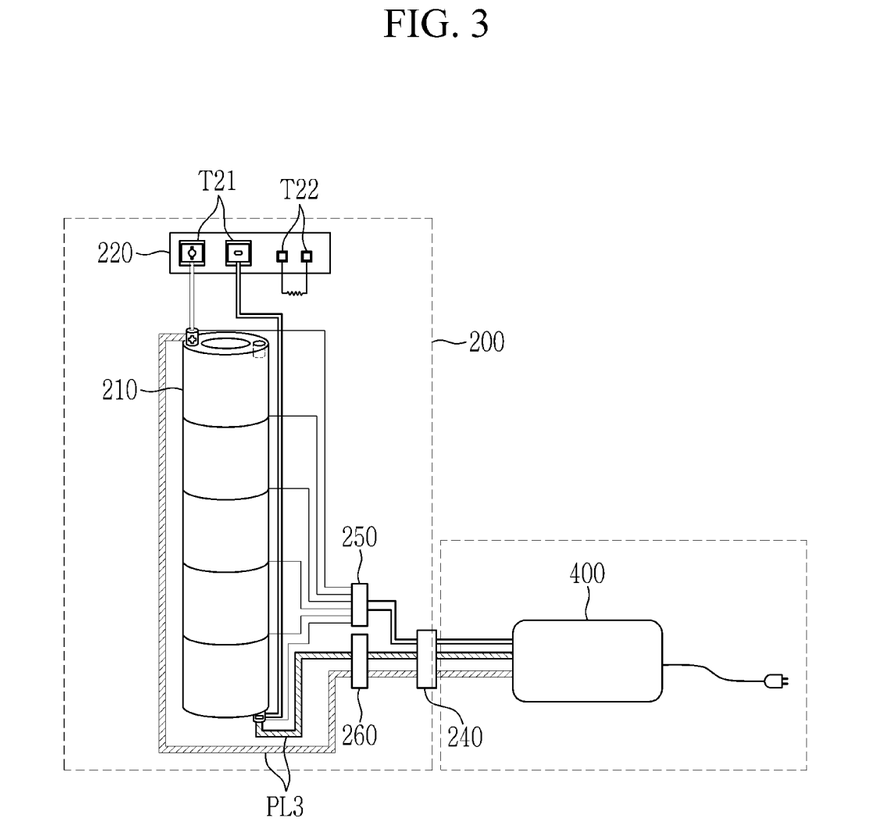
FIG. 3 shows an extension pipe of a wireless cleaner according to an example embodiment.

FIG. 1 shows a perspective view of a wireless cleaner according to an example embodiment. FIG. 2 shows a main driver of a wireless cleaner according to an example embodiment, and FIG. 3 shows an extension pipe of a wireless cleaner according to an example embodiment.

Referring to FIG. 1, the wireless cleaner 10 may include a body part 100, an extension pipe 200, and a dust suction part 300.

The body part 100 may generate suction force of the wireless cleaner 10, may filter air and foreign substances absorbed by the wireless cleaner 10, and may collect dust, and for this purpose, it may include a driver 110, a dust container 120, and a filter assembly 130.

The dust container 120 is a container for storing foreign substances, such as dust, absorbed through the dust suction part 300 of the wireless cleaner 10. The dust container 120 may be made of a transparent material so that an accumulated state of the foreign substance in the dust container 120 may be determined from the outside. To discharge the foreign substance accumulated in it, the dust container 120 may be combined to the wireless cleaner 10 in a detachable way. The filter assembly 130 may include at least one filter for performing a filtering function. The driver 110 may make an inside of the wireless cleaner 10 vacuous to generate suction force.

When a motor (refer to reference numeral 112 in FIG. 2) of the driver 110 quickly rotates a suction force generating device, that is, wafters (not shown) to make the inside of the wireless cleaner 10 vacuous, external air and foreign substance are absorbed into the wireless cleaner 10 through the dust suction part 300. The air and foreign substances absorbed in this way move to the body part 100 through the extension pipe 200, the air and foreign substances having moved to the body part 100 are filtered by the filter assembly 130, and air is discharged through the exhaust port, and the foreign substances are accumulated in the dust container 120.

Referring to FIG. 2, the driver 110 may include a battery module 111, a motor 112, a fuse 113, a docking connector 114, a power switch 115, an input and output module 116, and a main module 119.

The battery module 111 includes one or more rechargeable batteries (or rechargeable battery cells) connected in series or in parallel to each other, and may be used to supply electrical energy (or power) to the motor 112. As the rechargeable battery configuring the battery module 111, a nickel-cadmium battery, a lead-acid battery, a nickel metal hydride (NiMH) battery, a lithium ion battery, or a lithium polymer battery may be used.

The motor 112 may generate a driving force for driving the suction force generating device.

According to an embodiment, the motor 112 may receive power (or electrical energy) from the battery module 111 or a supercapacitor module (refer to reference numeral 210 in FIG. 3), and may generate a driving force for driving the absorbing device. The supercapacitor module 210 is a high power part, and the electrical energy supplied to the motor 112 from the supercapacitor module 210 may be electrical energy with a high current. On the contrary, the battery module 111 is a relative low output power part, and the electrical energy supplied to the motor 112 from the battery module 111 may be electrical energy with a low current. Therefore, wires for transmitting electrical energy to the motor 112 may be configured with high-current wires PL1 for applying a current with more than a predetermined value, that is, a high current, and low-current wires PL2 for applying a relatively low current. The high-current wires PL1 may, for example, have a diameter of equal to or more than about 3.0 mm so that they may not be overheated or fire may not outbreak when the current of 30 A flows. The low-current wires PL2 for applying a relatively low current may, for example, have a diameter of equal to or greater than 1.0 mm, which is less than that of the case of the high-current wires PL1. Further, not power lines for supplying a power voltage but signal wires for transmitting and receiving signals between the main module 119 and other constituent elements may have a diameter of, for example, about 0.3 mm to 0.5 mm in the entire system of the wireless cleaner 10.

The motor 112 may use a coil with a thickness of equal to or more than a predetermined value, and an initial speed may be controlled by a speed controller (not shown) so as to prevent generation of a short circuit when a high current is applied by the supercapacitor module 210 and an initial driving current becomes high. Further, to prevent the outbreak of fire on the coil inside the motor 112 by an instant overcurrent, a fuse 113 may be disposed in at least one of the high-current wires PL1. For example, a fuse with a maximum capacity of 30 A may be used as the fuse 113 combined to the high-current wires PL1.

The docking connector 114 is combined to the docking connector 220 of the extension pipe 200 to be described, and may include power receiving terminals T11 connected to respective electrode terminals of the supercapacitor module 210 included in the extension pipe 200, and detecting terminals T12 for detecting a combined state of the extension pipe 200.

The power receiving terminals T11 may be connected to power terminals of the motor 112 through the high-current wires PL1. As described above, the fuse 113 may be disposed between at least one power receiving terminal T11 and the power terminal of the motor 112 to protect the motor 112 from the overcurrent.

A power switch 115 for controlling supplying of the power of the supercapacitor module 210 to the motor 112 may be disposed between at least one power receiving terminal T11 and the power terminal of the motor 112, that is, on the high-current wires PL1 between the at least one power receiving terminal T11 and the power terminal of the motor 112. When the power switch 115 is not turned on, an electrical connection between the power receiving terminal T11 and the power terminal of the motor 112 is intercepted, and transmission of an output of the supercapacitor module 210 to the motor 112 may be blocked. On the other hand, when the power switch 115 is turned on, a current path between the power receiving terminal T11 and the power terminal of the motor 112 is formed, and the output of the supercapacitor module 210 may be transmitted to the motor 112. Conductivity of the power switch 115 may be controlled by the user input device 118 or the main module 119. The power switch 115 may be, for example, a relay.

The docking connector 114 may be disposed on a position to which the extension pipe 200 is combined in the body part 100, and the terminals T11 and T12 may be exposed to the outside so as to combine the extension pipe 200 and the docking connector 220.

The input and output module 116 may receive a control input for controlling an operation of the wireless cleaner 10 from the outside, that is, by a user, or may output information relating to the operation of the wireless cleaner 10.

The input and output module 116 may include a display device 117. The display device 117 may visually display charged states (charged amounts) of the battery module 111 and the supercapacitor module 210 or whether they are charged or not, and whether the supercapacitor module 210, that is, the extension pipe 200, is docked or not. Further, the display device 117 may visually display information for instructing an object that is used as a power source for driving the current motor 112 from among the battery module 111 and the supercapacitor module 210. For example, when the display device 117 includes a plurality of light emitting diodes (LED), it may display the above-described information through turn-on, turn-off, and colors of the respective light emitting diodes. An operation of the display device 117 may be controlled by the main module 119 to be described.

The input and output module 116 includes a user input device 118 for receiving a control input from the user, and the user input device 118 may generate a control signal corresponding to the control input provided by the user. For example, the user input device 118 includes a switch SW1, and it may generate a selection signal for selecting one of the battery module 111 and the supercapacitor module 210 as a power source for driving the motor 112 according to a manipulation of the switch SW1.

For example, with reference to FIG. 2, the switch SW1 includes an input terminal connected to an output node n1 of the main module 119, and output terminals respectively connected to an input node n2 of the main module 119 and a control node n3 of the power switch 115, and it may selectively output a voltage signal input by the output node n1 of the main module 119 to one of the two output terminals.

For example, when the switch SW1 is operated to select the battery module 111 as a power source, the voltage signal input from the output node n1 of the main module 119 may be transmitted to the input node n2 of the main module 119 by the switch SW1. Therefore, the main module 119 monitors the voltage applied to the input node n2 to identify whether the battery module 111 is selected as a power source. In this case, the voltage signal output from the main module 119 is blocked from being applied to the control node n3 of the power switch 115 by the switch SW1, so the power switch 115 may maintain the turn-off state.

Further, for example, when the switch SW1 is operated to select the supercapacitor module 210 as a power source, the voltage signal input from the output node n1 of the main module 119 may be transmitted to the control node n3 of the power switch 115 through the switch SW1. Therefore, the voltage signal output by the main module 119 is transmitted as a driving voltage of the power switch 115 through the switch SW1, so the power switch 115 may be changed to the turn-on state.

In an embodiment described with reference to FIG. 2, as described above, the switch SW1 does not directly control the electrical connection between the supercapacitor module 210 and the motor 112, but it controls the electrical connection between the supercapacitor module 210 and the motor 112 through the power switch 115. Therefore, it is prevented from generating sparks and damaging parts of the driver 110 when the supercapacitor module 210 is directly connected to the switch SW1.

It has been described with reference to FIG. 2 that the switch SW1 is disposed between the output node n1 of the main module 119 and the power switch 115, and the driving voltage output by the main module 119 is transmitted to the power switch 115 according to manipulation of the switch SW1, but the output node of the main module 119 may be directly connected to the control node of the power switch 115, and the main module 119 may directly output the driving voltage to the control node of the power switch 115 or may intercept the outputting of the driving voltage.

The main module 119 may perform functions of controlling general operations of the wireless cleaner 10 such as power supply and driving control of the motor 112, and charging control of the battery module 111 and the supercapacitor module 210.

The main module 119 may detect whether the extension pipe 200 is docked through the detecting terminals T12 of the docking connector 114. When the body part 100 is combined to the extension pipe 200, the corresponding terminals of the docking connector 114 of the body part 100 and the docking connector 220 of the extension pipe 200 are combined to each other, and the main module 119 may receive a docking signal through combination terminals T22. Referring to FIG. 3, respective ends of the docking detecting resistor 230 are connected to the combination terminals T22 of the docking connector 220 positioned on the extension pipe 200. Accordingly, the electrically separated detecting terminals T12 of the docking connector 114 are electrically connected to each other by the docking detecting resistor 230 when the body part 100 is combined to the extension pipe 200, and the docking signal generated by the electrical connection may be transmitted to the main module 119 and docking may be detected.

The main module 119 may control charging of the battery module 111 depending on whether the extension pipe 200 is docked. That is, when the extension pipe 200 is combined to the body part 100, the main module 119 may charge the battery module 111 with the electrical energy input from the supercapacitor module 210 through the power receiving terminals T11 of the docking connector 114. For this purpose, the main module 119 may include a regulator (not shown) or a DC-DC converter (not shown), and it may transform a voltage input from the supercapacitor module 210 through the regulator or the DC-DC converter into a voltage for charging the battery module 111. When the body part 100 is separated from the extension pipe 200, when the battery module 111 is fully charged while the extension pipe 200 is combined to the body part 100, or when a charged state of the supercapacitor module 210 is equal to or less than a predetermined level, the main module 119 may intercept the charging of the battery module 111 using the output of the supercapacitor module 210.

The main module 119 may control the display device 117 to visually display charged states (charged amounts) of the battery module 111 and the supercapacitor module 210 or whether they are charged or not, and whether the supercapacitor module 210, that is, the extension pipe 200, is docked or not The main module 119 may control supplying of power to the motor 112 depending on the output signal of the user input device 118 of the input and output module 116, that is, the switch SW1, or the docking state of the extension pipe 200.

The main module 119 may operate the battery module 111 as a power source of the motor 112 when a connection of the body part 100 and the extension pipe 200 is released. That is, when the wireless cleaner 10 starts to be operated while a docking release is detected through the detecting terminals T12, the main module 119 may transmit the output of the battery module 111 to power terminals of the motor 112 to drive the motor 112. The body part 100 may be directly combined to the dust suction part 300 when the docking of the extension pipe 200 is released, and in this case, the wireless cleaner 10 may be operated as a hand type.

The main module 119 may operate the supercapacitor module 210 with the power source of the motor 112 when the extension pipe 200 is docked to the body part 100. That is, when a docking signal is detected through the detecting terminals T12, the main module 119 turns on the power switch 115 by outputting a driving voltage to the control node n3 of the power switch 115 through the output node n1, and hence, an output of the supercapacitor module 210 may be transmitted to the power terminals of the motor 112.

Further, when the extension pipe 200 is docked to the body part 100, the main module 119 may operate the battery module 111 with the power source of the motor 112 according to an output signal of the switch SW1. Referring to FIG. 2, when the switch SW1 is operated to select the battery module 111 as a power source while the extension pipe 200 is docked to the body part 100, the main module 119 may recognize it and may transmit an output of not the supercapacitor module 210 but the battery module 111 to the power terminals of the motor 112. In this case, it is blocked by the switch SW1 to apply the driving voltage to the control node n3 of the power switch 115, thereby stopping the output of the supercapacitor module 210 from being transmitted to the motor 112.

The main module 119 further includes a voltage detecting circuit (not shown), and may detect a voltage of the battery module 111 through a voltage detecting circuit. Also, the main module 119 may detect the output voltage of the supercapacitor module 210 through the voltage detecting circuit while the body part 100 is combined to the extension pipe 200. The voltage detecting circuit may be electrically connected to the power terminals of the motor 112 or the power receiving terminals T11 of the docking connector 114 so as to detect the voltage of the supercapacitor module 210. When the output voltage of the supercapacitor module 210 becomes equal to or less than a predetermined value (e.g., 9 V), the main module 119 may additionally transmit the output of the battery module 111 to the power terminals of the motor 112 to maintain the driving force of the motor 112.

As described above, the extension pipe 200 includes a supercapacitor module 210 inside the extension pipe 200, and it may be used as a power source for supplying electrical energy to the motor 112 when docked to the body part 100. For this purpose, as shown in FIG. 3, the extension pipe 200 may include a supercapacitor module 210, a docking connector 220, and a docking detecting resistor 230.

The docking connector 220 may be disposed on one end combined to the body part 100 in the extension pipe 200, so it may be combined to the docking connector 114 of the body part 100 when the body part 100 is combined to the extension pipe 200. To combine the body part 100 and the docking connector 114, the terminals T21 and T22 of the docking connector 220 may be exposed to the outside. The docking connector 220 may include transmission terminals T21 connected to respective electrode terminals of the supercapacitor module 210, and combination terminals T22 combined to respective ends of the docking detecting resistor 230.

According to a characteristic of the supercapacitor module 210 instantly outputting a high current, high-current wires PL3 may be connected between the transmission terminals T21 and respective electrode terminals of the supercapacitor module 210 so as to protect the extension pipe 200 from overheating and fire. The high-current wires PL3 may, for example, have a diameter of equal to or greater than about 3.0 mm so that there may be no overheating or outbreak of fire when the current of 30 A flows.

The supercapacitor module 210 may include at least one supercapacitor. For example, the supercapacitor module 210 may include five supercapacitors with the capacity of 3 V and 3000 F, and connected in series to each other. However, the specification and the quantity of the supercapacitors configuring the supercapacitor module 210 are not limited thereto, so the capacity, the voltage, and the quantity of the supercapacitors configuring the supercapacitor module 210 are modifiable.

As shown in FIG. 1, the extension pipe 200 may be combined between the body part 100 and the dust suction part 300 and may be used as an extension pipe structure of the wireless cleaner 10, and may provide a passage for transmitting air and foreign substances absorbed by the dust suction part 300 to the body part 100. For this purpose, an external case configuring the extension pipe 200 has a pipe shape of which an internal space is empty, that is, a column shape (e.g., a circular cylinder), and the supercapacitor module 210 disposed inside the extension pipe 200 may be formed to have a column shape (e.g., a circular cylinder) having a hollow space used as a passage of the air and the foreign substances.

A supercapacitor configuring the supercapacitor module 210 will now be described with reference to FIG. 4A to FIG. 4C, and FIG. 5.

Figure 4A:
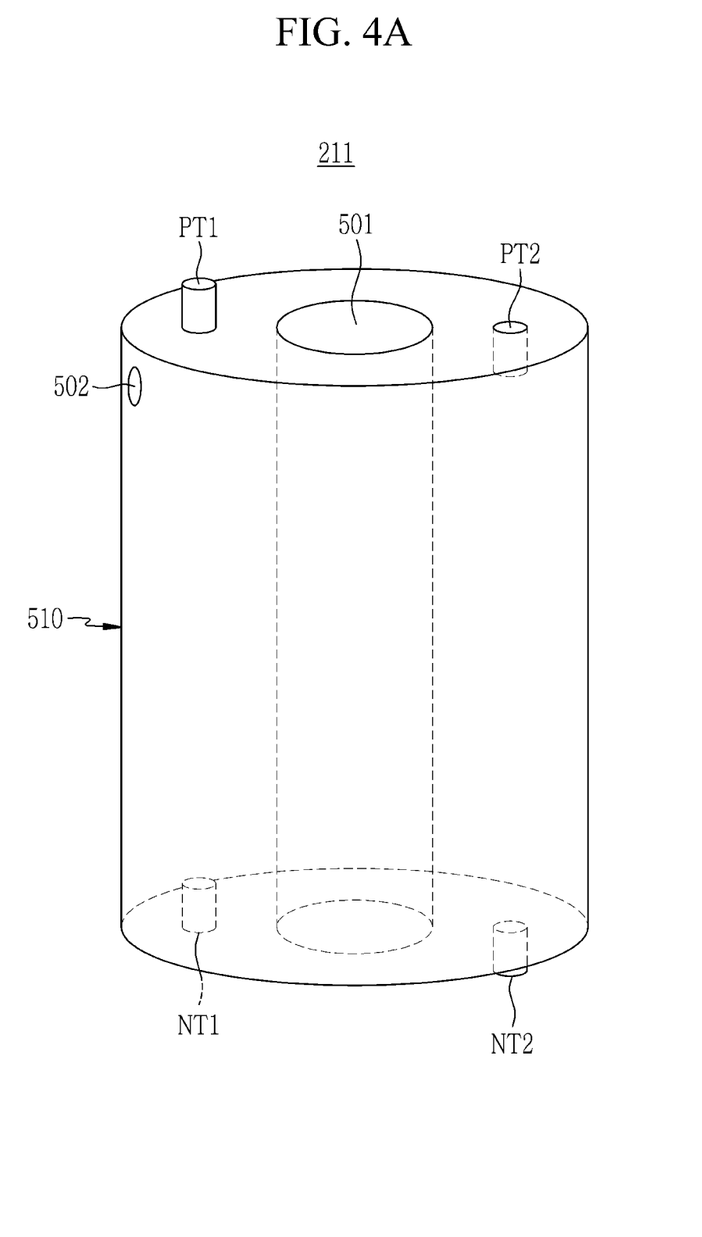
FIG. 4A shows a perspective view of a supercapacitor according to an example embodiment.
Figure 4B:
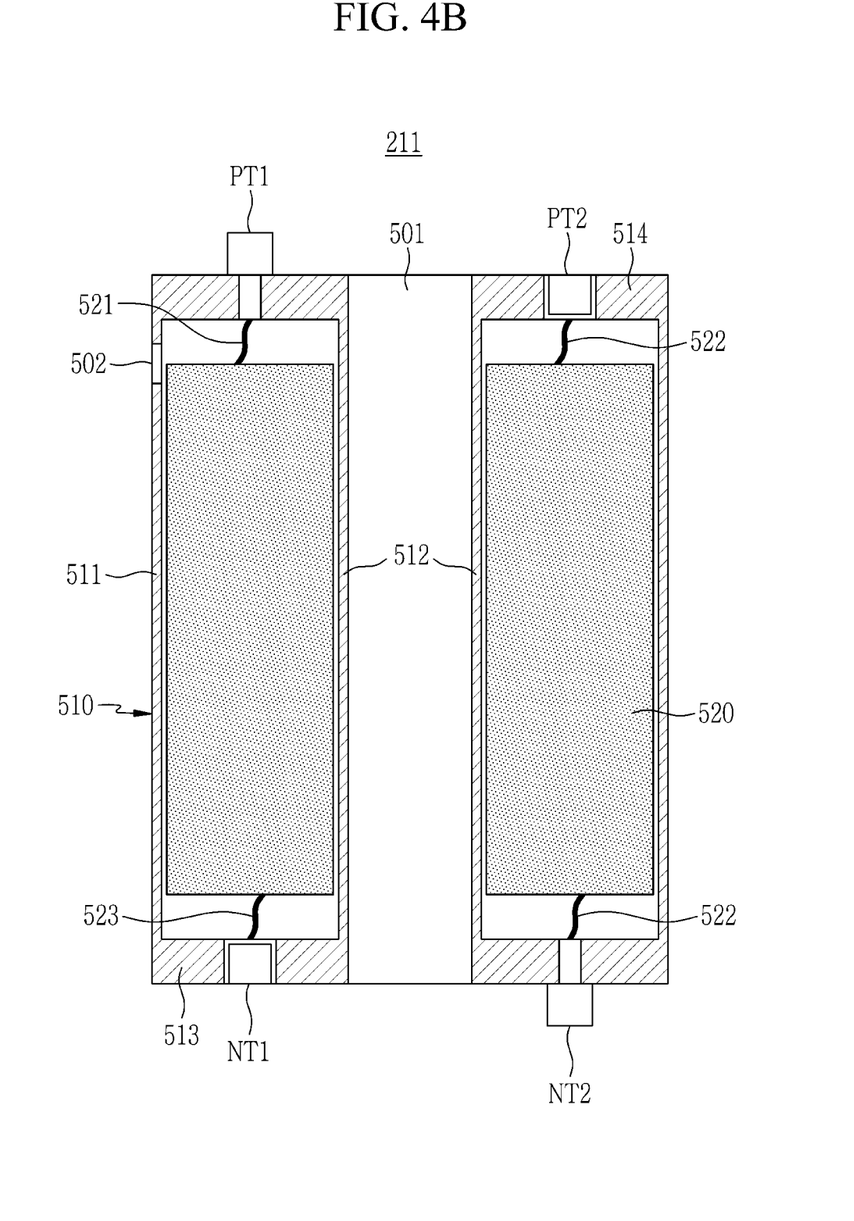
FIG. 4B shows a cross-section diagram of a supercapacitor according to an example embodiment.
Figure 4C:
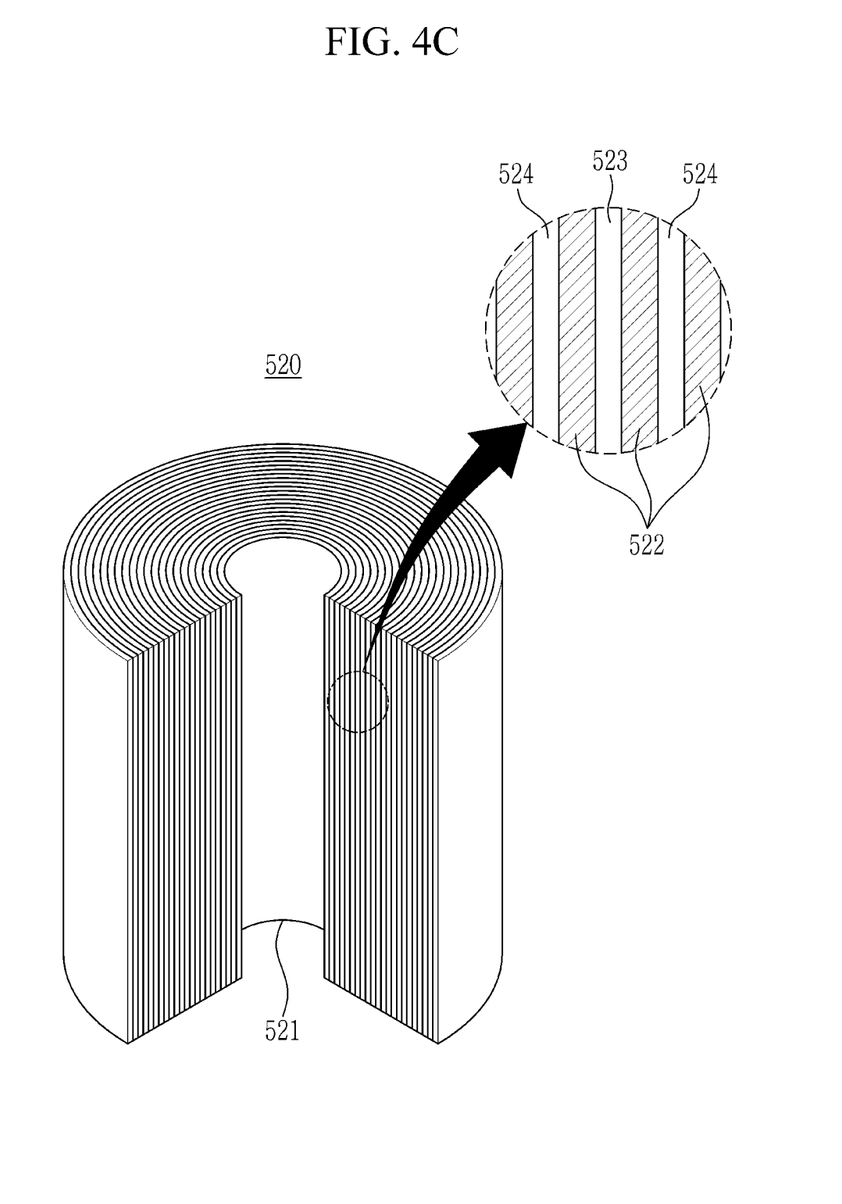
FIG. 4C shows a stacked structure of a supercapacitor according to an example embodiment.

FIG. 4A shows a stacked structure of a supercapacitor according to an example embodiment, FIG. 4B shows a cross-section diagram of a supercapacitor according to an example embodiment, and FIG. 4C shows a stacked structure of a supercapacitor in a hollow space type according to an example embodiment.

Referring to FIG. 4A to FIG. 4C, the supercapacitors 211 configuring the supercapacitor module 210 respectively have a cylindrical shape, and they may be hollow space type of capacitors of which a center portion has a through-hole in a length direction, that is, the hollow space 501. The hollow space 501 may be used as a passage for moving the air and foreign substance absorbed by the dust suction part 300 to the body part 100. The extension pipe 200 is combined between the body part 100 and the dust suction part 300, so the supercapacitor 211 positioned in the extension pipe 200 may be formed to be a hollow space type so as to provide the passage through which the air and the foreign substance pass.

The case 510 of the supercapacitor 211 may include an outer wall 511 and an inner wall 512 respectively formed to be cylindrical and separated from each other with a predetermined gap therebetween, and plates 513 and 514 combined to respective ends of the outer wall 511 and the inner wall 512 and closing and sealing the inner space of the case 510 from the outside.

The inner wall 512 is positioned in a cylindrical shape to surround the hollow space 501 so as to obtain a passage for air and foreign substances to pass through. The outer wall 511 has a cylindrical shape, and is positioned to be spaced from the inner wall 512 with a predetermined gap and surround the inner wall 512. A capacitor 520 may be disposed in an inner space between the outer wall 511 and the inner wall 512.

As shown in FIG. 4C, the capacitor 520 includes a positive electrode 523, a negative electrode 524, a separation film 522, and an electrolyte solution in a cylindrical shape wound with respect to the hollow space 521, and it may be formed by sequentially stacking a plurality of positive electrodes 523, a plurality of negative electrodes 524, and a plurality of separation films 522.

The first plate 513 is combined to one ends of the outer wall 511 and the inner wall 512, and it may include negative terminals NT1 and NT2 of the supercapacitor 211. For example with reference to FIG. 4A and FIG. 4B, the first plate 513 may include an indented negative terminal NT1 and a protruding negative terminal NT2. The embodiment is not limited by this, so one of the indented negative terminal NT1 and the protruding negative terminal NT2 may be omitted.

The second plate 514 is combined to the end facing the first plate 513 on the outer wall 511 and the inner wall 512, and may include positive terminals PT1 and PT2 of the supercapacitor 211. For example with reference to FIG. 4A and FIG. 4B, the second plate 514 may include a protruding positive terminal PT1 and an indented positive terminal PT2. The embodiment is not limited by this, and one of the protruding positive terminal PT1 and the indented positive terminal PT2 may be omitted.

The first and second plates 513 and 514 may include hollow spaces in their centers so as to obtain a passage for the air and the foreign substance to pass through.

As described above, the positive terminals PT1 and PT2 and the negative terminals NT1 and NT2 are formed to be indented or protruding in the supercapacitor 211, so the connection of the supercapacitors 211 in series may be easily realized by stacking and combining the supercapacitors 211.

Figure 5:
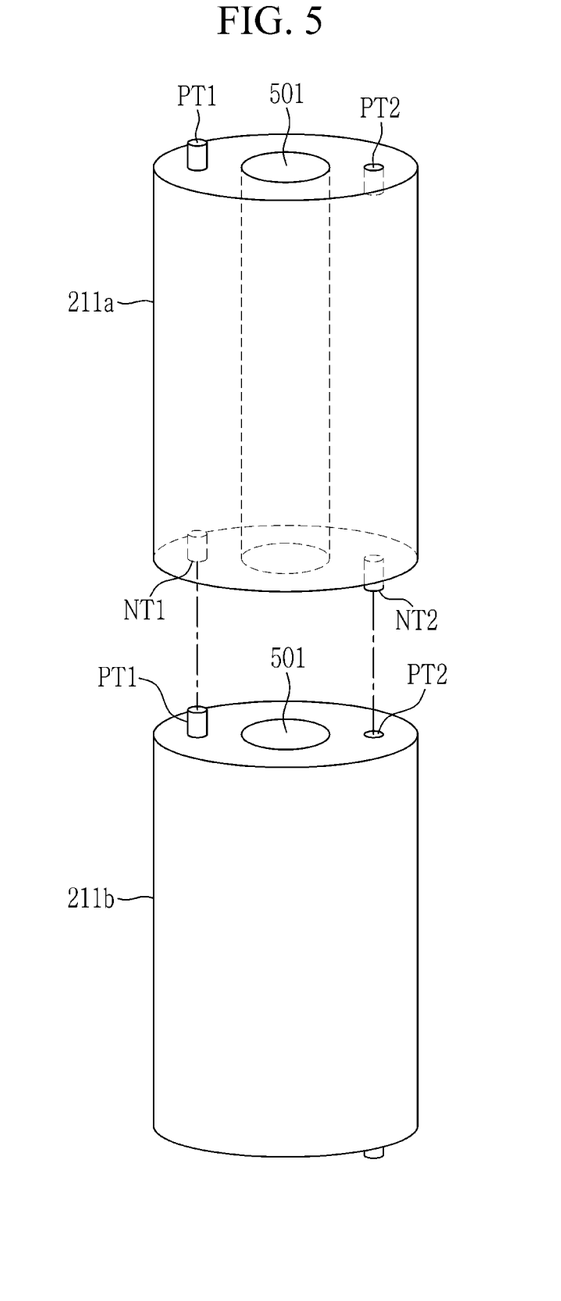
FIG. 5 shows a structure of supercapacitors connected in series to each other according to an example embodiment.

FIG. 5 shows a structure of supercapacitors connected in series to each other according to an example embodiment.

Referring to FIG. 5, when two supercapacitors 211a and 211bs are stacked to be combined, the protruding positive terminal PT1 of the second supercapacitor 211b may be inserted and combined to the indented negative terminal NT1 of the first supercapacitor 211a. Also, the protruding negative terminal NT2 of the first supercapacitor 211a may be inserted and combined to the indented positive terminal PT2 of the second supercapacitor 211b. By the above-described connection structure, the first and second supercapacitors 211a and 211b may be easily connected in series.

A spring washer (not shown) with high electrical conductivity may be inserted into a contact portion of the positive terminal and the negative terminal that are combined to each other when the supercapacitors 211a and 211b are stacked and combined, thereby improving electrical connection between the two terminals. Further, when the two supercapacitors 211a and 211bs are stacked and combined, a rubber or a special ring type of packing (not shown) may be combined to upper portions and lower portions of the supercapacitors 211a and 211b, that is, the first and second plates 513 and 514. The packing improves air-tightness on the bonding sides of the supercapacitors 211a and 211bs, so it maintains air-tightness of the hollow space 501 of the supercapacitor 211 when a plurality of supercapacitors 211 are combined, so the foreign substances move along the hollow space 501.

As described above, the supercapacitor 211 according to an embodiment may be stacked on another supercapacitor 211 and may then be combined with the same, and it is possible to close and seal the hollow space 501 on the inside, so it may be used as a stacked, closed, and sealed capacitor.

As the supercapacitors 211 are stacked and combined, when an overvoltage is provided in the supercapacitor 211, a safety cock 502 that is a safety means for discharging the gas in the supercapacitor 211 to the outside may be disposed on the side of the supercapacitor 211, that is, an outer wall of the supercapacitor 211.

FIG. 5 illustrates that the two supercapacitors 211a and 211bs are stacked and combined according to the method of inserting the protruding terminal into the indented terminal, and the embodiment is not limited thereto. A combination of the supercapacitors 211a and 211bs may form one of first and second plates 513 and 514 in a bolt shape and the other in a nut shape, and may use various methods such as a bolt-nut combining method or a screw combining method to the supercapacitors.

Referring to FIG. 3, the extension pipe 200 may further include a charging terminal 240. The supercapacitor module 210 of the extension pipe 200 may be connected to a charging device 400 through a charging terminal 240, and may be charged with the electrical energy supplied through the charging device 400 connected to an external power source. The diameter of the wires PL3 for connecting the supercapacitor module 210 and the charging device 400 in the extension pipe 200 may be set to satisfy standards for a quick charging within two minutes. For example, a high-current wire having the standard of equal to or less than 7AWG (American Wire Gauge) 200° C. may be used for the wires PL3 for connecting the supercapacitor module 210 and the charging device 400. A power cut-off device 260 may be additionally combined in the middle of the wire PL3. The power cut-off device 260 may automatically block the power supplied through the wire PL3 for the purpose of safety when the supercapacitor module 210 is overcharged with a voltage that is greater than a predetermined value because of a breakdown of the charging device 400 or the current that is greater than a design limit of the wire PL3 is applied to the wire PL3.

Figure 6:
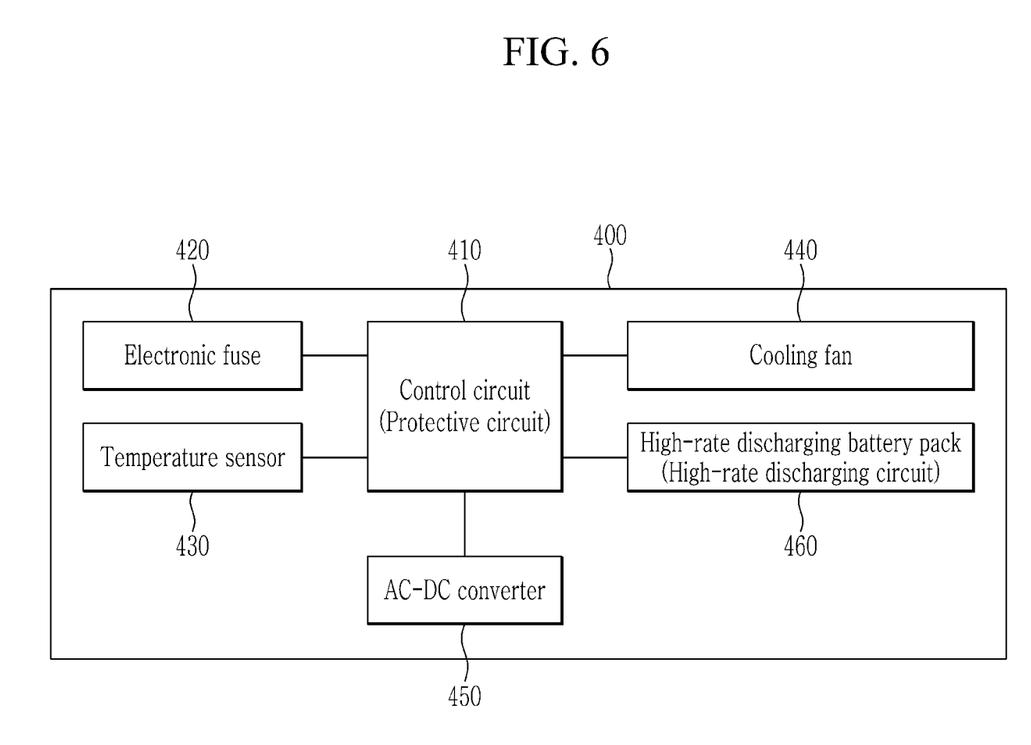
FIG. 6 shows a configuration diagram of a charging device according to an example embodiment.

FIG. 6 shows a configuration diagram of a charging device 400 according to an example embodiment.

Referring to FIG. 6, the charging device 400 may include a control circuit 410, an electronic fuse 420, a temperature sensor 430, a cooling fan 440, and an AC-DC converter 450.

Conventionally, the supercapacitor may include a balancer so as to increase charging efficiency and reduce risk of explosion. The supercapacitor module 210 may further include a balancer 250.

The control circuit 410 of the charging device 400 may function as a battery management system (BMS) of the supercapacitor module 210.

For example, the control circuit 410 is connected to the balancer 250 in the supercapacitor module 210 through the charging terminal 240, and it may balance the supercapacitors 211 included in the supercapacitor module 210 by use of the balancer 250. Therefore, the supercapacitors 211 included in the supercapacitor module 210 may maintain the optimized charging state, thereby obtaining the effect of the increase of the time to use the wireless cleaner 10.

To prevent generation of sparks caused by an input of a steep overcurrent to the supercapacitor module 210, the control circuit 410 of the charging device 400 may determine a connection to the supercapacitor module 210 by using the balancer 250 of the supercapacitor module 210, and may then supply a charging current to the supercapacitor module 210. Further, the control circuit of the charging device 400 may receive a signal from the balancer 250 to distinguish a charged state of the supercapacitor module 210, and may automatically finish the supplying of a charging current when the supercapacitor module 210 is fully charged.

The control circuit 410 of the charging device 400 may prevent overheating by driving the electronic fuse 420 or the cooling fan 440 based on temperature values of a wire and a circuit for supplying a current to the supercapacitor module 210 through the temperature sensor 430, and may prevent the outbreak of fire and explosion caused by an overcurrent, an overvoltage, or an overcharge based on the current and voltage values of the supercapacitor module 210.

The AC-DC converter 450 of the charging device 400 may receive an AC of 220 V and may convert it into a DC voltage (e.g., 15 DC volts) for charging the supercapacitor module 210. The control circuit 410 of the charging device 400 may detect a charged amount of the supercapacitor module 210, and may control the AC-DC converter 450 so as to control the charging current according to the charged amount of the supercapacitor module 210.

The charging device 400 may further include a high-rate discharging battery pack 460 for quickly charging the supercapacitor module 210. In this case, the high-rate discharging battery pack 460 may include a high-rate discharging circuit, and the control circuit 410 may further include a protective circuit. When the high-rate discharging battery pack 460 receives power from an AC source of 220 V (e.g., through the AC-DC converter 450) and is then changed, the high-rate discharge circuit may supply a high-current power provided by the high-rate discharging battery pack 460 to the supercapacitor module 210 to quickly charge the supercapacitor module 210 when the charging device 400 is combined to the wireless cleaner 10. In this instance, the high-rate discharge circuit may communicate with the balancer 250 through the charging terminal 240 of the wireless cleaner 10, and may control the current applied to the supercapacitor module 210 so that the charged current of the supercapacitor module 210 may be maintained at an optimized level. Further, when the high-rate discharging battery pack 460 enters an abnormal state, the protective circuit may stop a quick charging so as to prevent risky conditions such as explosion, may provide a detour charging path for performing a slow charging, and may drive the cooling fan 440.

Figure 7:
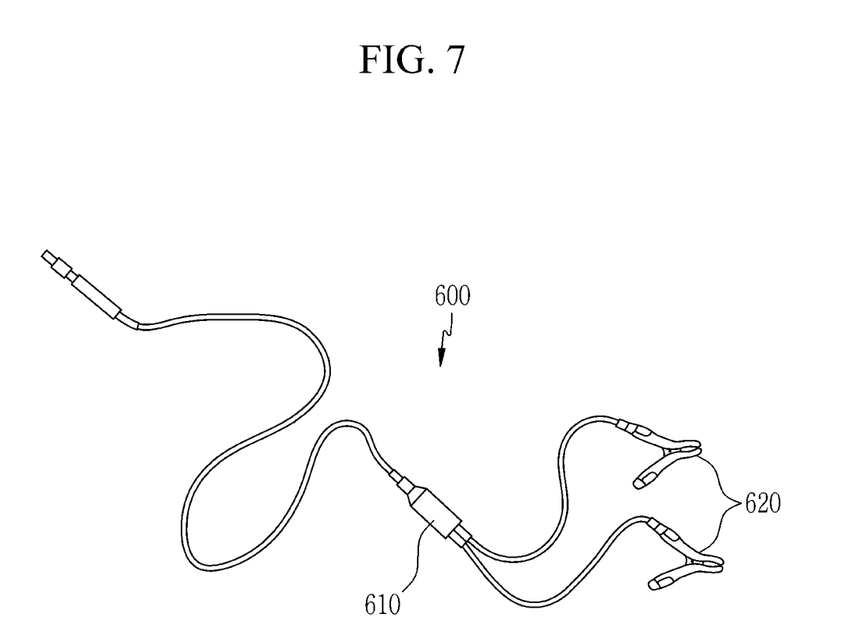
FIG. 7 shows a portable quick charging device according to an example embodiment.

In another way, the supercapacitor module 210 may be charged by a portable quick charging and discharging device 600 shown in FIG. 7. The portable quick charging and discharging device 600 is connected to the supercapacitor module 210 through the charging terminal 240, and it may charge the supercapacitor module 210 by using a battery pack (not shown) installed in a vehicle or a power voltage supplied by an additional DC power supply. The portable quick charging and discharging device 600 may include a charging and discharging limiting device 610 so as to prevent troubles caused by confusion of polarities when the terminals 620 are connected to the DC voltage. The charging and discharging limiting device 610 may, when the terminals 620 are erroneously connected, sense this and turn on an emission device (e.g., an LED) (not shown) or may output an alarm through a sound device (not shown). Further, the charging and discharging limiting device 610 may monitor the voltage (or a charged state) of the supercapacitor module 210, and when the voltage of the supercapacitor module 210 is equal to or greater than a predetermined value (e.g., 13.5 V), it may block the supplying of a charging current to the supercapacitor module 210.

The portable quick charging and discharging device 600 may receive a power voltage from the supercapacitor module 210 in the wireless cleaner 10 and may supply the same to an external load. For example, the portable quick charging and discharging device 600 may supply the power voltage provided by the supercapacitor module 210 in the wireless cleaner 10 as a load for starting a vehicle.

Table 1 expresses an example of comparing charging capacities, voltages, discharging cut-off voltages, maximum charging currents, maximum discharging currents, charging times (times up to full charging), and lifespans used for a general battery module, and the supercapacitor module used in an embodiment.

TABLE 1

| Category (conditions) | Charging capacity | Voltage | Discharging cut-off voltage | Maximum charging current | Maximum discharging current | Charging time | Lifespan |
|---|---|---|---|---|---|---|---|
| Nickel hydrogen (comparative example) | 8.64 W | 10.8 V | 7.6 V | 2.85 A | 0.6 A | About 17 minutes (Charging 15 V, 2 A) | About 1000 cycles |
| Supercapacitor (embodiment) | 18.75 W | 15 V | Below 1 V | 2663 A | 2663 A | About 1 minute (Charging 15 V, 80 A) | More than 100,000 cycles |

Referring to Table 1, the supercapacitor module 210 shows relatively higher output voltage than the nickel hydrogen battery. Therefore, as described with reference to the embodiment, strong suction force may be generated by driving the motor 112 with a high driving voltage by using the supercapacitor module 210 in an initial operation stage of the wireless cleaner 10. On the other hand, the discharging cut-off voltage of the supercapacitor module 210 is relatively lower than the nickel hydrogen battery, so an actually available time to use the supercapacitor module 210 may be longer than the nickel hydrogen battery with respect to the charging capacity. The charging time of the supercapacitor module 210 until the full charging is about one minute, and it may be charged within a relatively shorter time than the time (about 17 minutes in the case of a high-rate charging) used by the nickel hydrogen battery. Specifications of the supercapacitor written in Table 1 are given to describe effects of the embodiment, and the supercapacitor module 210 applied to the wireless cleaner 10 is not limited thereto.

When the battery module 111 configured with a rechargeable battery and the supercapacitor module 210 is used as a power source of the motor 112 in a like manner of the above-described embodiment, a time to use the wireless cleaner 10 may be increased by double because of the characteristics of the supercapacitor module 210. Further, the entire lifespan of the wireless cleaner 10 may be increased by using the supercapacitor module 210 with high durability as a main power source of the motor 112 and reducing the charging and discharging cycle of the battery module 111 installed in the body part 100 of the wireless cleaner 10.

Table 2 expresses an example of comparing specifications of generally-used charging devices for charging the supercapacitor.

TABLE 2

| Charging device model | Rated charging voltage current | Charging time | Weight | Etc. |
|---|---|---|---|---|
| GZL-30 | 14 V 11 A | About 7 minutes | 5 to 7 kg | Quick charging |
| PW1540 | 15 V 4 A | About 20 minutes | 0.3 kg | Slow charging |

Referring to Table 2, regarding the conventional quickly charged charging device (GZL-30), it is found that the charging time may be reduced, but the weights of constituent elements for realizing the quick charging are increased, so the entire weight of the charging device is increased. Therefore, in an embodiment, to minimize the increase of weight of the charging device 400 and allow high-rate charging, a high-rate discharging battery pack 460, and a high-rate discharge circuit and a protective circuit for supporting the same, are installed in the charging device 400 to thus realize a high-current quick charging (e.g., a quick charging of 15 V, 80 A). The increase of the weight of the charging device 400 caused by the use of the high-rate discharging battery pack 460 and the constituent elements (the high-rate discharge circuit and the protective circuit), may be, for example, less than about 1.7 kg, so when they are used, the total weight (e.g., less than about 2.0 Kg) of the charging device 400 may be reduced compared to the charging device for quick charging. Further, the power voltage charged in the high-rate discharging battery pack 460 may quickly charge the wireless cleaner 10 to reach a predetermined level or may be used as auxiliary battery when the power source for supplying a power voltage to the charging device 400 is blocked. In another way, the rated charging voltage and current of 15 V and 80 A of the charging device 400 is an example, and it may be changed by considering places, costs, sizes, and weights of the charging device 400.

According to the above-described embodiment, the electronic device using a hybrid charging device including a hybrid battery for improving the output characteristic by applying a supercapacitor, minimizing the increase of volume caused by this, and solving the generation of sparks in the supercapacitor.

The above-described embodiment may be realized as a computer readable code on a medium on which a program is recorded. The computer readable medium includes any kinds of recording devices in which data readable by a computer system are stored. The computer readable medium exemplifies a hard disk drive (HDD), a solid state disk (SSD), a silicon disk drive (SDD), a ROM, a RAM, a CD-ROM, a magnetic tape, a floppy disk, and an optical data storage device, and also includes a realization in a carrier wave form (e.g., transmission via the Internet). Further, the computer may include a control unit of the terminal. While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: wireless cleaner
100: body part
110: driver
111: battery module
112: motor
113: fuse
114: docking connector
115: power switch
116: input and output module
117: display device
118: user input device
119: control module
120: dust container
130: filter assembly
200: extension pipe
210: supercapacitor module
211, 211a, 211b: supercapacitor
220: docking connector
230: docking detecting resistor
240: charging terminal
250: balancer
260: power cut-off device
300: dust suction part
400: charging device
410: control circuit
420: electronic fuse
430: temperature sensor
440: cooling fan
450: AC-DC converter
460: high-rate discharging battery pack
501: hollow space
502: safety cock
510: case
511: outer wall
512: inner wall
513: first plate
514: second plate
520: capacitor
600: portable quick charging and discharging device

What is claimed is:

1. An electronic device comprising:
a dust suction part;
a body part including a motor for generating suction force of the electronic device and a battery module operable by a power source of the motor; and
an extension pipe combined between the dust suction part and the body part and providing a passage for moving foreign substances absorbed through the dust suction part to the body part,
wherein the extension pipe includes
a pipe-type external case,
a supercapacitor module disposed in an inner space of the pipe-type external case and including a hollow space used as the passage, and
a first docking connector for transmitting electrical energy of the supercapacitor module to the motor when the body part is combined to the extension pipe, and
wherein the hollow space is formed to penetrate the supercapacitor module in a direction in which the absorbed foreign substances move.

2. The electronic device of claim 1, wherein
the supercapacitor module includes a plurality of supercapacitors connected to each other in series, and
the supercapacitors respectively have a cylindrical shape in which a hollow space used as the passage is formed in a center.

3. The electronic device of claim 2, wherein
the supercapacitors respectively include
a case including an inner wall in a cylindrical shape, an outer wall in a cylindrical shape spaced from the inner wall with a predetermined gap and surrounding the inner wall, and first and second plates respectively combined to respective ends of the inner wall and the outer wall and closing and sealing a space between the inner wall and the outer wall;
a capacitor disposed in a space between the inner wall and the outer wall;
a first electrode terminal in a protruding shape formed on the first plate; and
a second electrode terminal in an indented shape formed on the second plate.

4. The electronic device of claim 3, wherein
the supercapacitors include first and second supercapacitors connected to each other in series, and
the first electrode terminal of the second supercapacitor is inserted and combined to the second electrode terminal of the first supercapacitor.

5. The electronic device of claim 4, wherein
the supercapacitors respectively further include:
a third electrode terminal in an indented shape formed on the first plate and having a same polarity as the first electrode terminal; and
a fourth electrode terminal in a protruding shape formed on the second plate and having a same polarity as the second electrode terminal, and the fourth electrode terminal of the first supercapacitor is inserted and combined to the third electrode terminal of the second supercapacitor.

6. The electronic device of claim 3, further comprising a packing in a ring shape disposed between the second plate of the first supercapacitor and the first plate of the second supercapacitor.

7. The electronic device of claim 3, further comprising a safety cock disposed on the outer wall and discharging gas inside the case to an outside.

8. The electronic device of claim 1, wherein the body part includes:
a second docking connector connected to the supercapacitor module through the first docking connector when the body part is combined to the extension pipe;
a power switch disposed to at least one of wires for connecting terminals of the second docking connector and the motor and switching an electrical connection between the second docking connector and the motor; and
a control module for detecting whether the extension pipe is combined to the body part, and controlling the power switch so as to form a current path between the supercapacitor module and the motor when the body part is combined to the extension pipe.

9. The electronic device of claim 8, wherein the control module is connected to the second docking connector, and charges the battery module with an output of the supercapacitor module when the body part is combined to the extension pipe.

10. The electronic device of claim 9, wherein the control module detects a voltage of the supercapacitor module when the body part is combined to the extension pipe, and it transmits an output of the battery module to the motor when a voltage of the supercapacitor module is equal to or less than a predetermined value.

11. The electronic device of claim 10, wherein the control module transmits an output of the battery module to the motor when the combination of the body part and the extension pipe is removed.

12. The electronic device of claim 8, wherein the body part further includes a switch for selecting one of the supercapacitor module and the battery module as a power source of the motor, and
the power switch is turned on or turned off according to an operation of the switch.

13. The electronic device of claim 12, wherein when the switch is operated to select the supercapacitor module as a power source of the motor, the power switch is turned on by the switch and an output of the supercapacitor module is transmitted to the motor, and
when a voltage of the supercapacitor module becomes equal to or less than a predetermined value or the switch is operated to select the battery module as a power source of the motor, the power switch is maintained in a turn-off state, and an output of the battery module is transmitted to the motor by the control module.

* * * * *